United States Patent [19]
Stein

[11] 3,758,927
[45] Sept. 18, 1973

[54] CUTOFF TOOL
[75] Inventor: William B. Stein, Barberton, Ohio
[73] Assignee: The Warner & Swasey Company, Cleveland, Ohio
[22] Filed: Dec. 13, 1971
[21] Appl. No.: 207,056

[52] U.S. Cl. .................................................. 29/96
[51] Int. Cl. ............................................. B26d 1/00
[58] Field of Search .................................. 29/95, 96

[56] References Cited
UNITED STATES PATENTS
| 3,662,445 | 5/1972 | Whitaker | 29/96 X |
| 3,611,525 | 10/1971 | Cochran | 29/95 |
| 3,518,737 | 7/1970 | Hood | 29/96 |

FOREIGN PATENTS OR APPLICATIONS
968,241  9/1964  Great Britain........................... 29/96

Primary Examiner—Leonidas Vlachos
Attorney—J. William Freeman et al.

[57] ABSTRACT

An improved cutoff tool made up of a tool body, a support blade clamped thereto, and a clamping member adapted to be secured to the tool body and overlie the support blade so that an insert bit and stop member may be clamped between the clamping member and the support blade, with the support blade and the tool body interlocking so as to provide added rigidity and extreme compactness.

4 Claims, 4 Drawing Figures

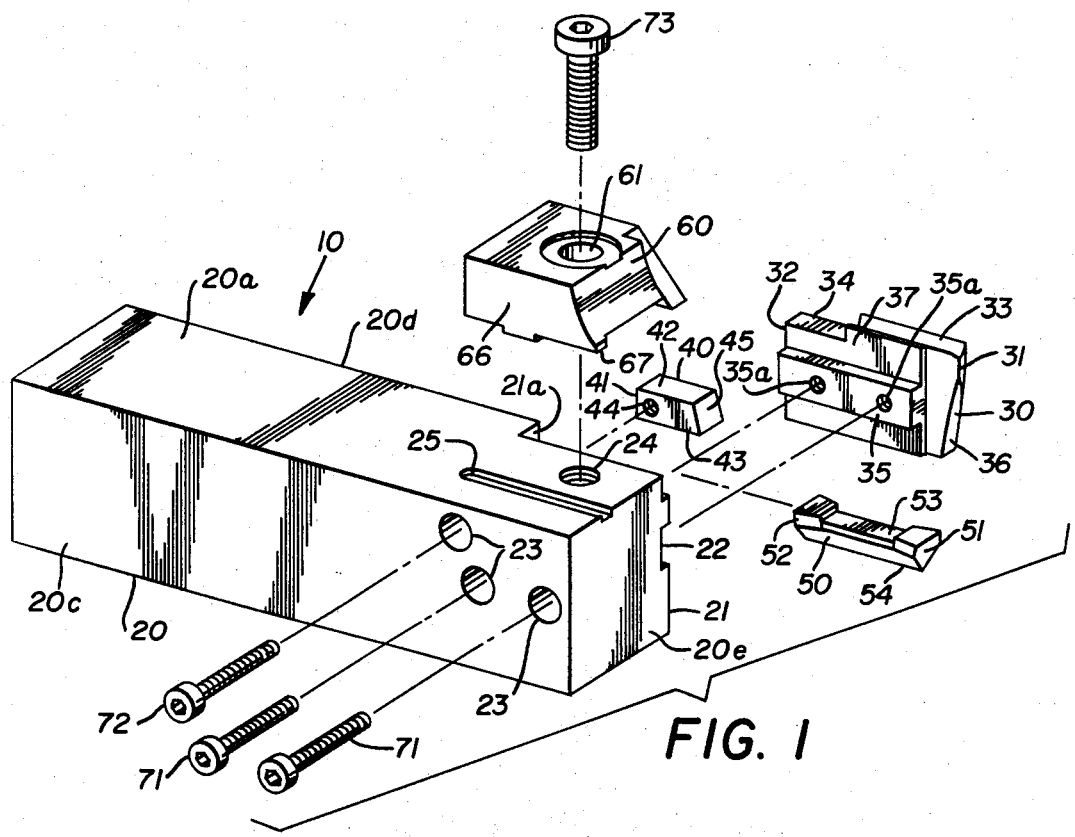
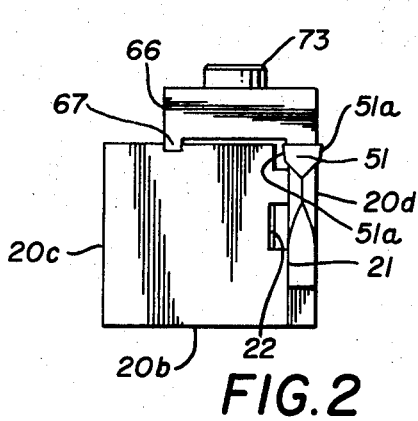
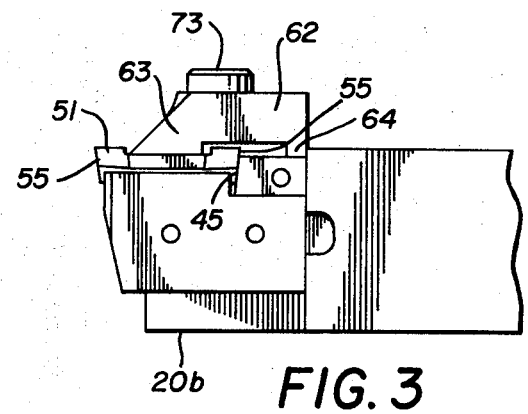
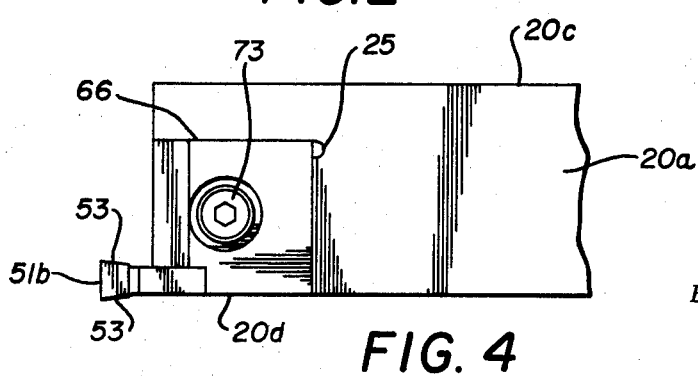
INVENTOR.
WILLIAM B. STEIN
BY Freeman & Taylor
ATTORNEYS

CUTOFF TOOL

BACKGROUND OF THE INVENTION

1. Field of the Invention

This invention relates to the art of metal cutoff, and particularly relates to tooling of the type that is designed to be mounted on a cross slide for movement radially inwardly with respect to a revolving workpiece so as to effectuate cutoff thereof.

2. Description of the Prior Art cutoff tools of the general type herein being contemplated originally came into popular acceptance in the late 1950's, with Novkov U.S. Pat. No. 2,846,756 illustrating a typical cutoff tool of this type.

While the tool described in the aforementioned Novkov patent has achieved universally wide acceptance and constituted an advance in the art, it has none-the-less been found that the overall effectiveness of such tooling can be improved if certain modifications are made as follows.

SUMMARY OF THE INVENTION

First, it has been found that if a mechanical interlock is effectuated between the tool body and the support blade by providing a tongue and groove type of connection, a considerable number of advantages occur. Thus, it enables the support blade to be of a lesser length, which accordingly means that a shorter insert bit of lesser cost can be used especially if the support blade is contoured to receive a stop member, as will hereinafter be described.

Also, it has been found that if the stop member is provided with an appropriately contoured face, the same will be permitted to serve as a stop against the unused end of a double-ended cutoff insert without any damage to the cutting tip thereof during the period of stored non-use.

Additional advantages have been obtained by drawing the support blade and stop member against the face of the tool body provided therefor so that easier accessibility for the purpose of changing the support blade exists.

The invention consists of providing a new combination of unique components that coact together to produce a new and improved result not obvious from the prior art. The use of an interlocking arrangement between the support blade and the tool body, coupled with the particular shaping of the top surface of the support blade so as to permit simultaneous reception and clamping thereon of an insert and a stop member, further enhances the overall utility of the invention.

Production of a tool having the above-noted characteristics accordingly becomes the principal object of the invention, with other objects thereof becoming more apparent upon reading the following brief specification considered and interpreted in view of the accompanying drawings.

Of the drawings:

FIG. 1 is an exploded perspective view showing the principal components of the invention.

FIG. 2 is a front elevational view.

FIG. 3 is a partial side elevational view.

FIG. 4 is a partial top plan view.

DESCRIPTION OF THE PREFERRED EMBODIMENTS

Referring now to the drawings, and in particular to FIG. 1, the improved cutoff tool, generally designated by the numeral 10, includes a tool body 20, a support blade 30, a stop 40, an insert 50, and a clamping block 60, the arrangement being such that screws 71,71 are used to draw the support blade 30 onto the tool body, with screw 72 holding the stop member in place with respect to the tool body 20 so as to permit the stop member 40 and the insert 50 to be clamped on top of the support blade 30 by the clamping member 60 which is, in turn, drawn down by the screw 73.

With reference to the detailed construction of the tool body 20, the same is shown as being of generally elongate, rectangular configuration in elevation so as to include a top surface 20a, a bottom surface 20b, an access side surface 20c, and a cutting side surface 20d.

The side surface 20d is undercut adjacent the forward end 20e so as to define a recessed surface 21, with this surface 21 further being provided with a groove 22 therein that coacts with the support blade 30, as hereinafter will be described. Transverse bores 23,23,23 are provided in body 20 and are designed to accommodate the screw members 71,71 and 72, while a tapped and threaded opening 24 is provided in the top surface 20a for reception of the screw 73. A slot 25 is also provided in the top surface 20a of body 20 for coaction with the clamping member 60 as will be described.

The support blade 30 is generally of blade-like configuration and has a forward end 31, a rearward end 32, and a top surface that is defined by a V-shaped frontal support portion 33 and a rearwardly presented planar surface 34. A rib 35 extends longitudinally of the blade 30 on one side thereof and is provided with threaded openings 35a,35a that receive the threaded ends of the screw members 71,71.

Front clearance is provided by the relieved surface area 36, while the side surface 37 is designed to be flush with the recessed surface 21 of the tool body 20 upon the rib 35 being inserted in groove 22 and drawn tightly therein by the action of the screw members 71,71.

Turning now to the construction of the stop member 40, it will be noted that the same is of generally block-like configuration so as to include a rear surface 41 that is designed to abut against the shoulder 21a of tool body 20, a top surface 42 that is designed to be clamped by the rearward portion of the clamping member as will be described, and a bottom surface 43 that is adapted to be seated on the surface 34.

A tapped aperture 44 receives the screw member 72 while an inclined frontal surface 45 is adapted to serve as a seat for the unused end of the insert 50, as clearly shown in FIG. 3.

Preferably the angle of inclination of the face 45 corresponds to the front clearance angle provided on the insert 50 so that a firm mating seat is provided. The dimensional relationship between surfaces 34 and 37 on the support blade and the height of insert 50 and stop 40 are preferably as shown so that there will be no surface on stop 40 acting against the cutting edge portion of the unused end of the double-ended insert. This avoids damage to the unused end.

The insert 50, shown in the preferred embodiment of the invention, generally conforms to the outline configuration of the insert shown in U.S. Pat. No. 3,611,525, although it is to be understood that a carbide tip can be placed on the end portion in lieu of the integral construction shown.

In all events, the illustrated insert 50 includes cutting ends 51 and 52 interconnected by a reduced height central portion 53, with the unit having a V-shaped bottom surface 54, as clearly shown in FIGS. 1 and 2 of the drawings. Referring to FIG. 2, the cutting end 51 is provided with the usual side tapering surfaces 51a,51a while FIG. 4 shows how the top surfaces 51b have back clearance provided thereon, as indicated by the numerals 53,53 in FIG. 4 of the drawings. A front clearance 55 is provided on the front surface of both ends 51 and 52, with it being noted that the front clearance 55 is complemental to the angle of surface 45 of the stop member 40, as best shown in FIG. 3.

It should be noted that while the invention has been illustrated in connection with a double-ended insert, it is also possible to utilize the broad concept disclosed herein with a single-ended insert if desired. Furthermore, it is also possible to utilize an insert which has no front clearance angle, such as is illustrated in the drawings.

Referring again to the drawings, the clamp member 60 is generally of block-like configuration and includes a central bore 61 through which the bolt 73 may be passed for clamping purposes. Referring now to FIG. 3, it will be noted that one side 62 of the clamping block 60 includes a bit clamping arm 63 and a stop clamping arm 64, with these two arms being intended to clamp the bit and stop members in position, as clearly shown in FIGS. 2, 3, and 4 of the drawings. In addition to the aforementioned component parts, the remaining side surface 66 includes a depending rib portion 67 (see FIG. 2) which rides in the slot 25 in the top surface 20a of body 20 for alignment purposes.

In use or operation of the improved cutoff tool, it will first be assumed that the component parts have been machined to the contour shown in FIG. 1. At this time it is merely necessary that the screws 71,71 be passed through the openings 23,23 and into the threaded openings, 35a,35a in the support blade where the blade will be drawn into contact with the surface 21 as has been described.

Following this the stop 40 may be positioned on the surface 34 of blade 30 by inserting the screw 72 in the aperture 23 and into threaded opening 44. At this time it is merely necessary that the V-shaped surface 54 of the bit 50 be placed on the surface 33 of blade 30. When the stop is so positioned, one end of bit 50 will project slightly beyond the front edge of the blade, as shown in FIG. 3, and at this time it is merely necessary to place the clamp 60 in position by engaging the rib 67 and groove 25. Following this, the bolt 73 can be screwed into the opening 24 so that arm 63 engages the central area 53 of insert 50, while arm 64 engages surface 42 of stop 40.

At this time the tool is ready for use.

It will be seen from the foregoing that there has been provided a new and improved type of cutoff tool that is characterized by the unique use of an improved stop means that permits the use of a double-ended insert without any damage to the end portion not being used.

It will be further noted how the provision of a stop member of this type enables some degree of adjustment to be obtained since the stops can be made of varying lengths so as to vary the degree of projection of the bit member 50 beyond the support blade 30.

Further, it will be seen how the interlocking rib and groove arrangement employed between the support blade and tool body produces a resistance against cutting forces that is augmented by the screws 71,71 being directly attached thereto from the opposed side so as to provide a highly simplified type of cutoff arrangement wherein no projections are provided on the cutting side.

Finally, it has been shown how the use of the unique stop permits the length, and therefore cost, of the cutting insert to be substantially reduced without materially effecting the overall operation of the cutoff tool.

While a full and complete description of the invention has been set forth in accordance with the dictates of the Patent Statutes, it is to be understood that the invention is not intended to be limited to the specific embodiments herein shown. Accordingly, modification of the invention may be resorted to without departing from the spirit hereof or the scope of the appended claims.

What is claimed is:

1. A cutoff tool of the character described, comprising;
  A. a tool body having
    1. a front end
    2. a cutting side surface
    3. a top surface
    4. an access side surface;
  B. a support blade having
    1. a top surface defined by
      a. a frontally disposed V-shaped bit-receiving edge portion and
      b. a rearwardly disposed planar top surface disposed below the plane of said bit-receiving surface;
      c. a transversely projecting elongated rib extending longitudinally of said support blade;
  C. a support pocket defined by said cutting side surface of said body and contoured for substantially flush reception of said support blade therein;
  D. an elongate groove provided on one face of said pocket and adapted to receive said rib, whereby the bottom walls of said pocket and said groove provide dual support for said support blade when the same is positioned therein;
  E. means for securing said support blade in said pocket with said rib in said groove;
  F. a reversible insert bit having
    1. opposed cutting tips and
    2. a V-shaped bottom edge adapted to be received on said V-shaped edge of said support blade and
    3. a planar top surface intermediate said cutting tips and
    4. equal front clearance angles provided on said cutting tips;
  G. a stop member
    1. secured within said pocket on said planar surface of said support blade rearwardly of said insert
      a. whereby said stop limits rearward movement of said insert relatively of said support blade;
  H. clamping means
    1. releasably secured with respect to the top surface of said tool body and
    2. having first and second clamping areas simultaneously clamping said bit and said stop between said clamping means and the top surfaces of said support blade.

2. The cutoff tool of claim 1 further characterized by the fact that the front face of each end of said cutoff insert is inclined to the horizontal at the same angle as the face of said stop that engages said insert.

3. A support blade for use in a cutoff tool having an access side surface and a longitudinally extending recess in said side surface comprising;
 A. an elongate body;
 B. the top surface of said body being defined by
  1. a frontally disposed V-shaped bit-receiving edge portion and
  2. a rearwardly disposed planar top surface disposed beneath the plane of said bit-receiving surface and being coextensive therewith; and
 C. a longitudinally extending rib projecting from one side of said body and adapted to engage the recess in said cutoff tool; the length of said rib being substantially less than the overall length of said bit-receiving surface and said rearwardly disposed planar top surface.

4. A cutoff tool of the character described, comprising;
 A. a tool body having
  1. a front end
  2. a cutting side surface
  3. a top surface
  4. an access side surface;
 B. a support blade having
  1. a top surface defined by
   a. a frontally disposed V-shaped bit-receiving edge portion and
   b. a rearwardly disposed planar top surface disposed below the plane of said bit-receiving surface;
  c. a transversely projecting elongated rib extending longitudinally of said support blade;
 C. a support pocket defined by said cutting side surface of said body and contoured for substantially flush reception of said support blade therein;
 D. an elongate groove provided on one face of said pocket and adapted to receive said rib, whereby the bottom walls of said pocket and said groove provide dual support for said support blade when the same is positioned therein;
 E. means for securing said support blade in said pocket with said rib in said groove;
 F. an insert bit having
  1. at least one cutting tip and
  2. a V-shaped bottom edge adapted to be received on said V-shaped edge of said support blade and
  3. a planar top surface behind said cutting tip and
  4. a front clearance angle provided on said cutting tip;
 G. a stop member
  1. secured within said pocket on said planar surface of said support blade rearwardly of said insert
   a. whereby said stop limits rearward movement of said insert relatively of said support blade; and
 H. clamping means
  1. releasably secured with respect to the top surface of said tool body and
  2. having first and second clamping areas simultaneously clamping said bit and said stop between said clamping means and the top surface of said support blade.

* * * * *